US012809315B2

(12) United States Patent
Hayashi

(10) Patent No.: US 12,809,315 B2
(45) Date of Patent: Nov. 24, 2026

(54) STUD, HAIRSPRING WITH STUD AND MANUFACTURING METHOD THEREOF, BALANCE WITH HAIRSPRING, AND WATCH

(71) Applicant: SEIKO EPSON CORPORATION, Tokyo (JP)

(72) Inventor: Shigeyuki Hayashi, Shiojiri (JP)

(73) Assignee: SEIKO EPSON CORPORATION (JP)

(*) Notice: Subject to any disclaimer, the term of this patent is extended or adjusted under 35 U.S.C. 154(b) by 258 days.

(21) Appl. No.: 18/748,670

(22) Filed: Jun. 20, 2024

(65) Prior Publication Data

US 2024/0427290 A1 Dec. 26, 2024

(30) Foreign Application Priority Data

Jun. 22, 2023 (JP) ................................ 2023-102306

(51) Int. Cl.
*G04B 17/32* (2006.01)
*G04B 17/06* (2006.01)

(52) U.S. Cl.
CPC ......... *G04B 17/325* (2013.01); *G04B 17/063* (2013.01)

(58) Field of Classification Search
CPC ...... G04B 17/32; G04B 17/325; G04B 17/34; G04B 17/063
See application file for complete search history.

(56) References Cited

U.S. PATENT DOCUMENTS

| | | | | | |
|---|---|---|---|---|---|
| 3,842,592 | A * | 10/1974 | Giger | G04B 17/325 368/178 |
| 4,083,179 | A * | 4/1978 | Giger | G04B 17/325 968/138 |
| 10,018,965 | B2 * | 7/2018 | Christan | G04B 17/325 |
| 2017/0017204 | A1 * | 1/2017 | Stranczl | G04B 17/325 |
| 2017/0248918 | A1 * | 8/2017 | Christan | G04B 17/063 |
| 2019/0346812 | A1 | 11/2019 | Christan | |
| 2020/0292992 | A1 * | 9/2020 | Kaelin | G04B 17/325 |

FOREIGN PATENT DOCUMENTS

JP 2019-200199 A 11/2019

* cited by examiner

*Primary Examiner* — Edwin A. Leon
*Assistant Examiner* — Jason M Collins
(74) *Attorney, Agent, or Firm* — Harness, Dickey & Pierce, P.L.C.

(57) ABSTRACT

A stud includes a support portion formed into a shape of a column, and a spring receiving portion being provided on the support portion and including a slit portion to which a hairspring is to be inserted and fixed. The spring receiving portion is formed into a truncated conical shape centered on a center line that passes through the center of the column. The groove that forms a constricted portion on an outer periphery is provided between the support portion and the spring receiving portion. The slit portion is a notch portion that is formed from an upper surface toward a bottom surface of the spring receiving portion in the truncated conical shape, and thrusts into a portion of the groove.

9 Claims, 10 Drawing Sheets

STUD, HAIRSPRING WITH STUD AND MANUFACTURING METHOD THEREOF, BALANCE WITH HAIRSPRING, AND WATCH

The present application is based on, and claims priority from JP Application Serial Number 2023-102306, filed Jun. 22, 2023, the disclosure of which is hereby incorporated by reference herein in its entirety.

BACKGROUND

1. Technical Field

The present disclosure relates to a stud, a hairspring with stud and a manufacturing method thereof, a balance with hairspring, and a watch including the balance with hairspring.

2. Related Art

A mechanical watch uses a hairspring in a speed regulation mechanism. Due to the nature of keeping motion accuracy with the hairspring formed from a spiral spring, it is necessary to conduct adjustment by directly touching the hairspring after an end portion of the hairspring is attached and fixed to a stud. In this instance, there is a possibility that the hairspring comes off the stud in case of an insufficient fixation strength. Accordingly, there has been proposed a technique for firmly attaching the end portion of the hairspring to the stud.

For example, JP-A-2019-200199 discloses a stud provided with a slit portion to which an end portion of a hairspring is set. Here, a through hole is provided in a side wall of the slit portion and inside of the slit portion is filled with an adhesive such that the through hole is also filled with the adhesive (FIG. 1C, for example). Accordingly, when the adhesive is cured, the adhesive inside the through hole functions as a locking portion so as to prevent the adhesive from dropping off the slit portion. Meanwhile, a notch may be formed at a lower part of the side wall of the slit portion instead of the through hole (FIG. 2D, for example).

However, the stud according to JP-A-2019-200199 has problems of a complicated structure and of a large number of machining processes involved. To be more precise, the stud formed into a columnar shape basically involves machining in a circumferential direction. Meanwhile, machining of the linear slit portion involves a different process and drilling in the side wall of the slit portion involves another different process. Thus, the large number of machining processes are involved, thus leading to poor manufacturing efficiency.

In short, there has been a demand for a stud which is excellent in manufacturing efficiency and capable of preventing an adhesive from dropping off.

SUMMARY

A stud according to an aspect of the present application includes a support portion formed into a shape of a column, and a spring receiving portion being provided on the support portion and including a slit portion to which a hairspring is to be inserted and fixed. Here, the spring receiving portion is formed into a truncated conical shape centered on a center line that passes through the center of the column. A groove that forms a constricted portion on an outer periphery is provided between the support portion and the spring receiving portion. Moreover, the slit portion is a notch portion that is formed from an upper surface toward a bottom surface of the spring receiving portion in the truncated conical shape, and thrusts into a portion of the groove.

A hairspring with stud according to an aspect of the present application is a hairspring with stud formed by attaching an end portion of a hairspring to a stud by using an adhesive. Here, the stud is provided with a slit portion to which the end portion of the hairspring is to be inserted and fixed, and a groove formed on an outer periphery. The slit portion thrusts into a portion of the groove, and the adhesive is present in the slit portion and in the groove.

A manufacturing method of a hairspring with stud according to an aspect of the present application includes preparing a slit portion to which an end portion of a hairspring is to be inserted and fixed and a stud provided with a groove formed on an outer periphery, filling inside of the slit portion with an adhesive in a state of inserting the end portion of the hairspring into the slit portion, and curing the adhesive. Here, in the filling with the adhesive, the adhesive is caused to thrust into and fill the groove. Moreover, in the curing, the adhesive is cured in a state of being present in the groove.

A balance with hairspring according to an aspect of the present application includes the above-described hairspring with stud, a balance staff rotatably supported by a receiving member, a balance wheel fixed to the balance staff, and a collet fixed to the balance staff.

A watch according to an aspect of the present application includes the above-described balance with hairspring, and a movement containing the balance with hairspring.

A stud according to another aspect of the present application is a stud including a slit portion to which a hairspring is to be inserted and fixed. Here, the stud includes a groove that forms a constricted portion on an outer periphery at a position overlapping a bottom surface of the slit portion.

DESCRIPTION OF EMBODIMENTS

Embodiment 1

Outline of Watch

Figure 1:
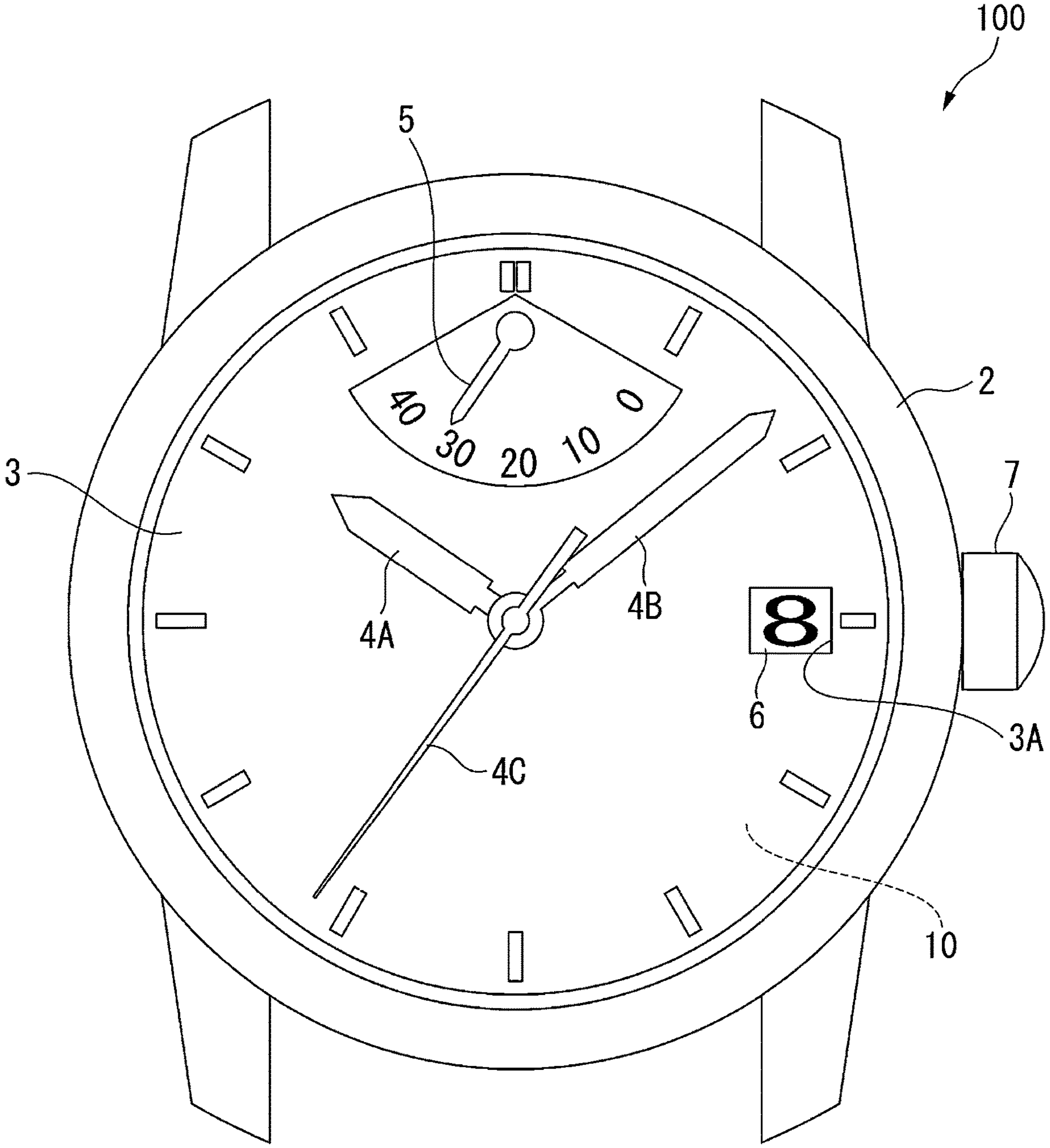
FIG. 1 is a plan view of a watch according to Embodiment 1.

FIG. 1 is a plan view of a watch according to the present embodiment.

A watch 100 of the present embodiment is an analog three-hand mechanical watch.

The watch 100 illustrated in FIG. 1 is a wrist watch to be worn around a wrist of a user. The watch 100 includes a cylindrical exterior casing 2, and a dial 3 is disposed on an inner peripheral side of the exterior casing 2. Of two openings of the exterior casing 2, an opening on a front surface side is covered with a cover glass and an opening on a back surface side is covered with a back cover.

Meanwhile, the watch 100 includes a movement 10 housed in the exterior casing 2, an hour hand 4A, a minute hand 4B, and a second hand 4C which indicate time information, and a power reserve hand 5 that indicates duration of a not-illustrated spring provided to the movement 10.

The respective hands 4A to 4C and the power reserve hand 5 are attached to hand spindles of the movement 10 and are driven by the movement 10. Here, a power reserve function may be omitted.

The dial 3 is provided with a small calendar window 3A and a date indicator 6 is visible through the small calendar window 3A.

A crown 7 is provided on a side surface of the exterior casing 2. The crown 7 can be pulled out in two stages from an ordinary position (a zeroth stage position) where the crown 7 is pushed into the center of the watch 100.

It is possible wind up the spring as will be described later by turning around the crown 7 at the zeroth stage position. The power reserve hand 5 moves in conjunction with the wind-up of the spring. The watch 100 of the present embodiment can ensure the duration of about 40 hours when the spring is fully wound up.

When the crown 7 is pulled out to a first stage position and is turned around, it is possible to adjust the date by moving the date indicator 6. The second hand 4C is stopped when the crown 7 is pulled out to a second stage position. When the crown 7 is turned around at the second stage position, it is possible to set the time by moving the hour hand 4A and the minute hand 4B.

Figure 2:
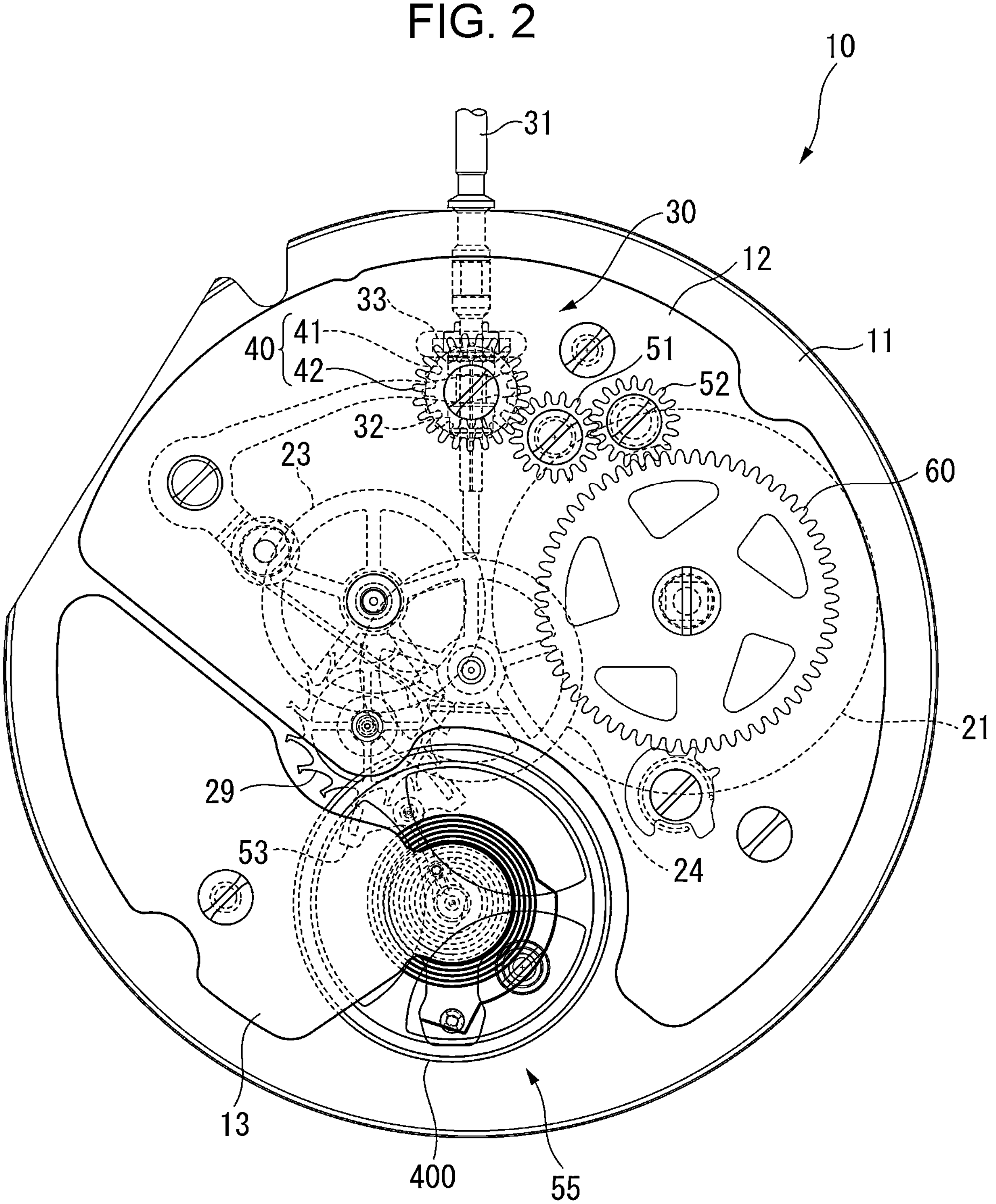
FIG. 2 is a transparent plan view of a movement.

FIG. 2 is a transparent plan view of the movement.

The movement 10 includes a main plate 11, a barrel and train wheel bridge 12, and a balance bridge 13. A barrel wheel (a barrel complete) 21 housing the spring, a center wheel and pinion (not illustrated) a third wheel and pinion 23, a fourth wheel and pinion 24, and an escape wheel and pinion 29 are disposed between the main plate 11 and the barrel and train wheel bridge 12.

Meanwhile, a pallet fork 53, a speed regulator 55, and the like are disposed between the main plate 11 and the balance bridge 13.

A stem-winding mechanism 30 includes a setting stem 31, a clutch wheel 32, a winding pinion 33, a crown wheel 40, a first intermediate wheel 51, and a second intermediate wheel 52, which are pivotally and rotatably supported by the barrel and train wheel bridge 12. The stem-winding mechanism 30 is configured to transmit rotation associated with a rotating operation of the crown 7 to a ratchet wheel 60 so as to rotate the ratchet wheel 60 and a barrel arbor, thereby winding up the spring. Here, the crown wheel 40 is formed from a first crown wheel 41 engaged with the winding pinion 33, and a second crown wheel 42 rotated integrally with the first crown wheel 41 and engaged with the first intermediate wheel 51.

Configuration of Speed Regulator

Figure 3:
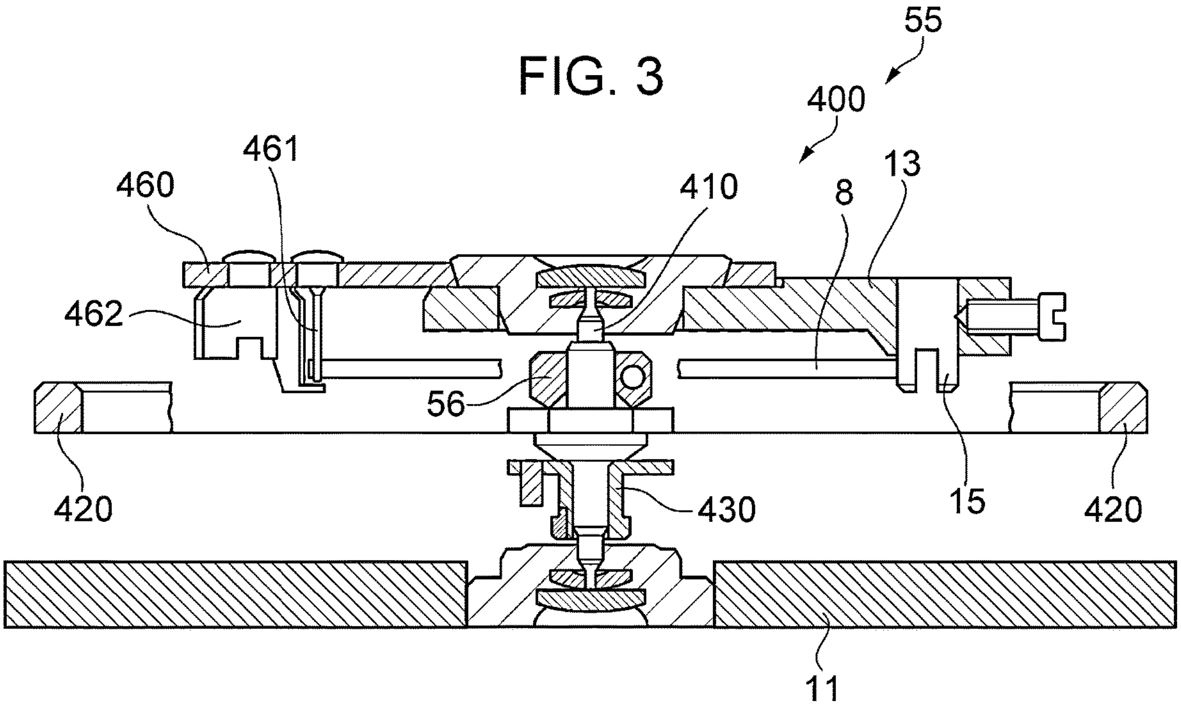
FIG. 3 is a cross-sectional view of a speed regulator.
Figure 4:
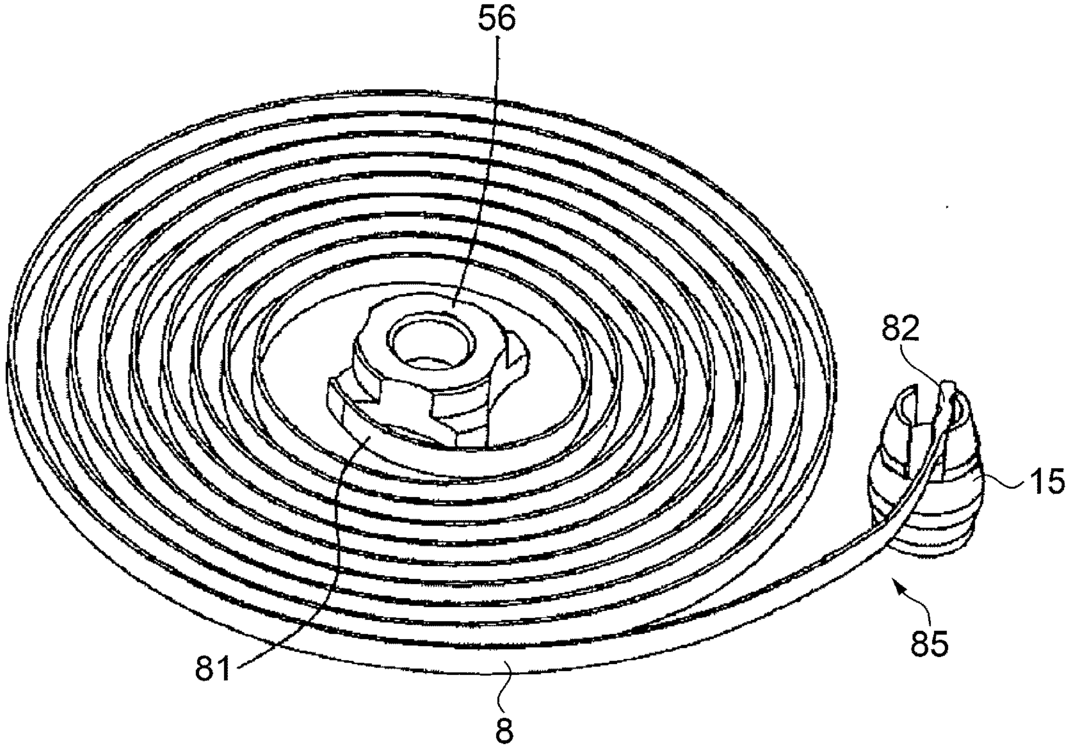
FIG. 4 is a perspective view of a hairspring.

FIG. 3 is a cross-sectional view of the speed regulator. FIG. 4 is a perspective view of a hairspring.

As illustrated in FIG. 3, the speed regulator 55 includes a balance with hairspring 400.

The balance with hairspring 400 includes a balance staff 410, a balance wheel 420, a collet 56, a stud 15, a regulator 460, and a hairspring 8.

The balance staff 410 is rotatably supported by the main plate 11 and the balance bridge 13. Accordingly, the main plate 11 and the balance bridge 13 collectively constitute a receiving member that pivotally supports the balance staff 410. The balance wheel 420, a roller 430, and the collet 56 are fixed to the balance staff 410 and these constituents are configured to be rotated integrally.

The regulator 460 includes a regulating pin 461 and a contact portion 462.

FIG. 4 is the perspective view of the hairspring 8 in FIG. 3 viewed from the main plate 11 side.

As illustrated in FIG. 4, an inner end portion 81 of the hairspring 8 is fixed to the collet 56 and an outer end portion 82 thereof is fixed to the stud 15. In a preferred example, the hairspring 8 is formed from a plate-like elastic material such as Co-elinvar which is an alloy containing Cr, Ni, Co, and the like. Note that the hairspring 8 only needs to be the plate-like elastic material and may be made of silicone instead, for example. In other words, the balance with hairspring 400 includes the balance staff 410 rotatably supported by the receiving member, the balance wheel 420 fixed to the balance staff 410, the collet 56 fixed to the balance staff 410, and a hairspring with stud 85.

As illustrated in FIG. 3, in the above-described speed regulator 55, when balance wheel 420 is rotated pivotally around the balance staff 410, the collet 56 is also rotated in association therewith. Thus, a biasing force of the hairspring 8 acts on the balance wheel 420. When this biasing force comes into balance with an inertial force of the balance wheel 420, the rotation of the balance wheel 420 is stopped and then the balance wheel 420 is rotated in an opposite direction due to the biasing force of the hairspring 8. In other words, the balance wheel 420 repeats oscillation pivotally around the balance staff 410.

Configuration of Stud

Figure 5:
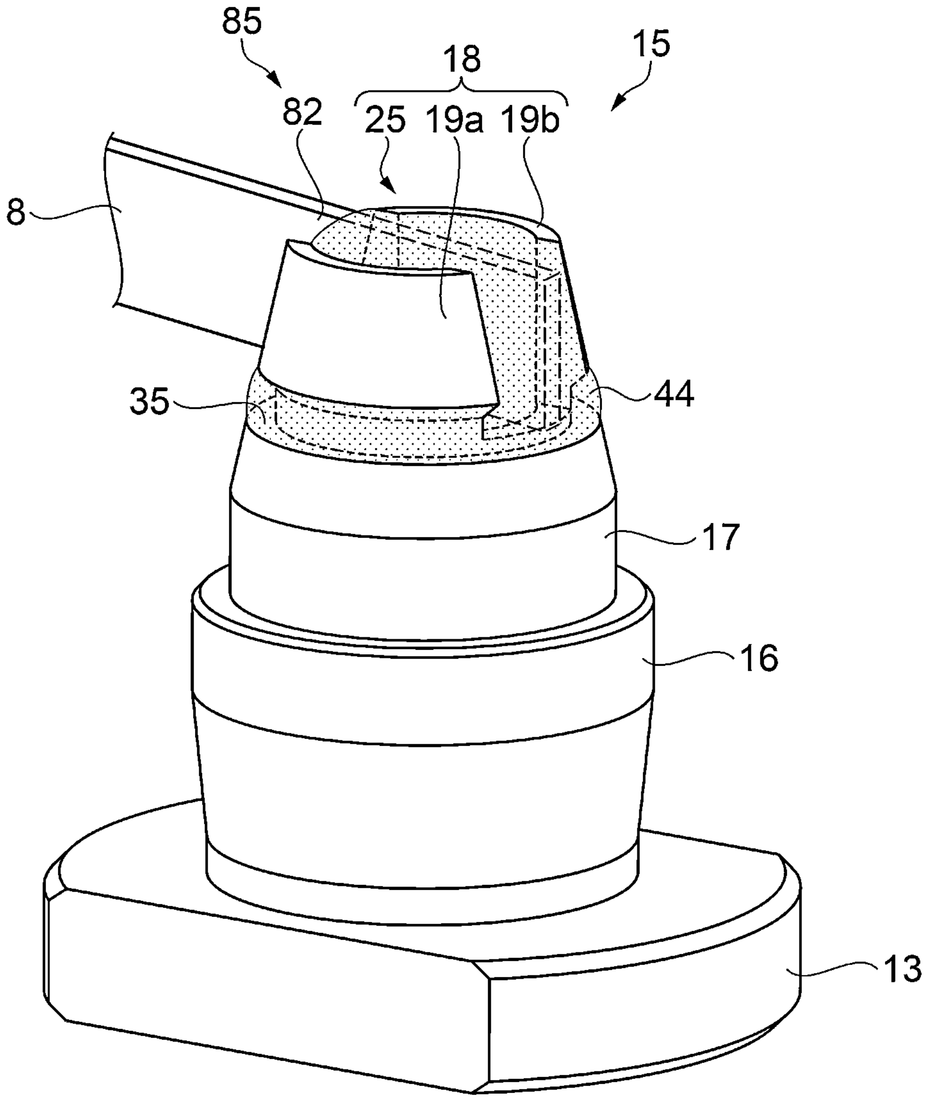
FIG. 5 is a perspective view of a hairspring with stud.

FIG. 5 is a perspective view of the hairspring with stud.

FIG. 5 is the perspective view of a peripheral portion of the stud 15 in FIG. 4, which is viewed from a different angle.

As illustrated in FIG. 5, the stud 15 includes a support portion 17 and a spring receiving portion 18, which are located on a columnar base portion 16.

The spring receiving portion 18 is a portion that supports and fixes the outer end portion 82 of the hairspring 8. The spring receiving portion 18 is formed into a truncated conical shape and provided with a pair of side walls 19*a* and 19*b*, a slit portion 25, a groove 35, and the like. The groove 35 is an annular groove formed by cutting an outer periphery between the support portion 17 and the spring receiving portion 18.

As illustrated in FIG. 5, the outer end portion 82 of the hairspring 8 is attached and fixed to the spring receiving portion 18 in a state of being inserted into the slit portion 25 by using an adhesive 44. Here, a component in which the outer end portion 82 of the hairspring 8 is fixed to and integrated with the stud 15 will be hereinafter referred to as the hairspring with stud 85. Here, the adhesive 44 is put in and integrated with the inside of the slit portion 25 as well as the entire periphery of the groove 35. In this way, the adhesive 44 inside the groove 35 serves as a locking portion, so that the adhesive 44 can be prevented from dropping off the slit portion 25. In other words, it is possible to prevent the hairspring 8 from coming off the stud 15. Here, a manufacturing method inclusive of filling with the adhesive 44 will be described later.

Figure 6:
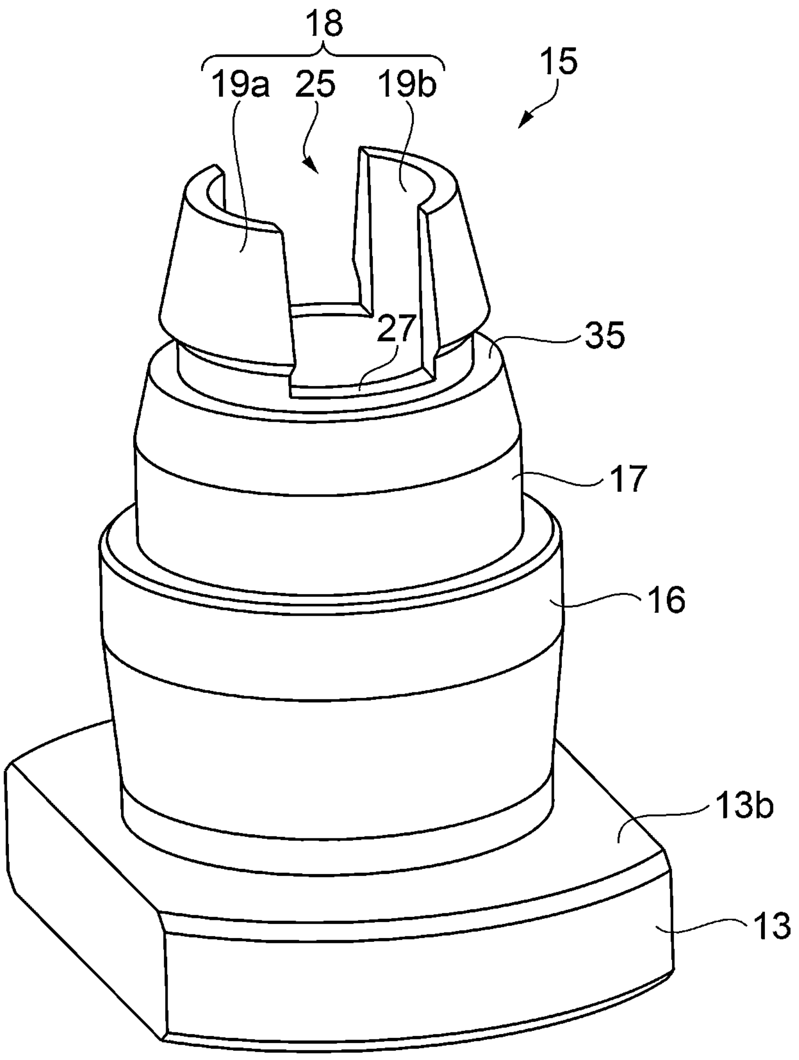
FIG. 6 is a perspective view of a stud.
Figure 7:
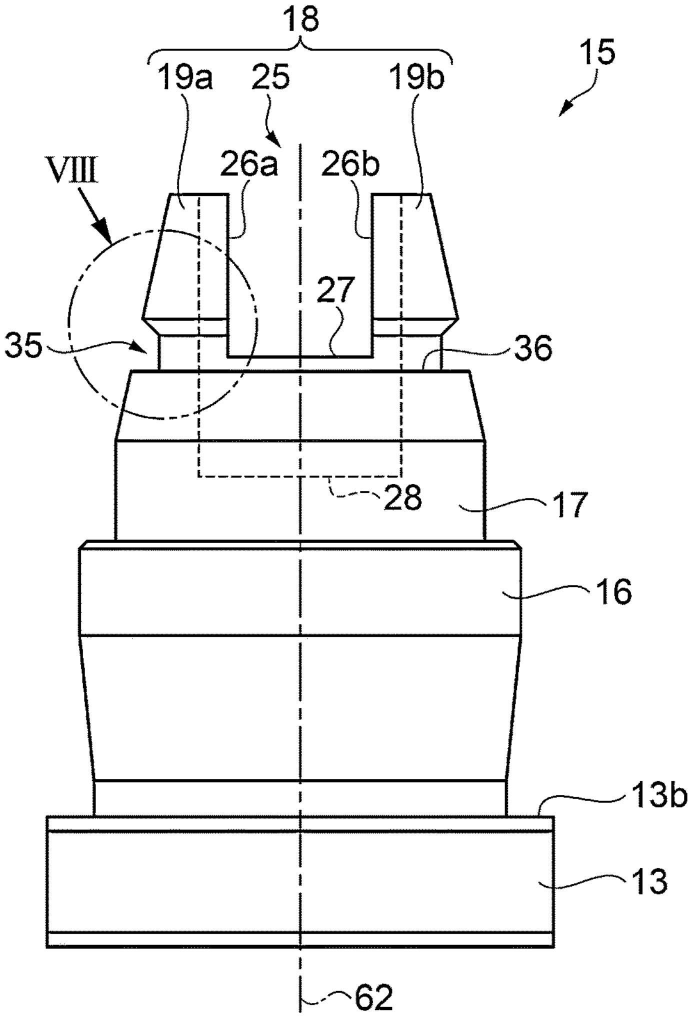
FIG. 7 is a side view of the stud.
Figure 8:
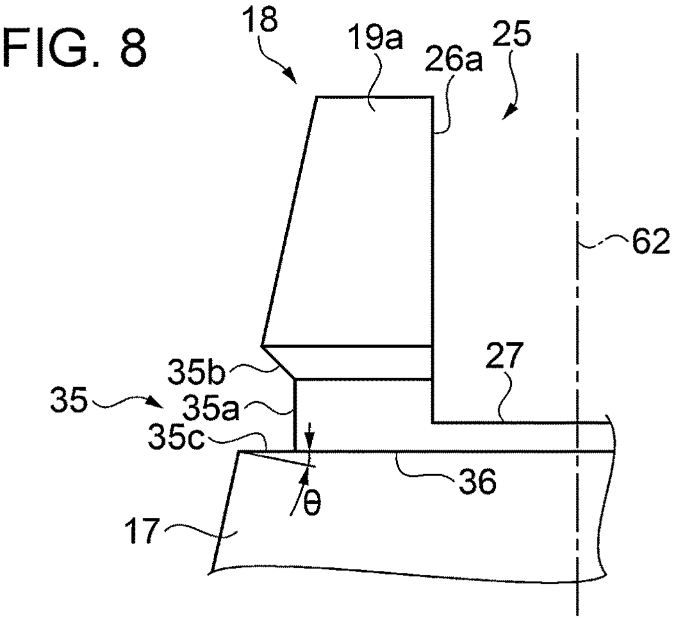
FIG. 8 is an enlarged diagram of part VIII in FIG. 7.
Figure 9:
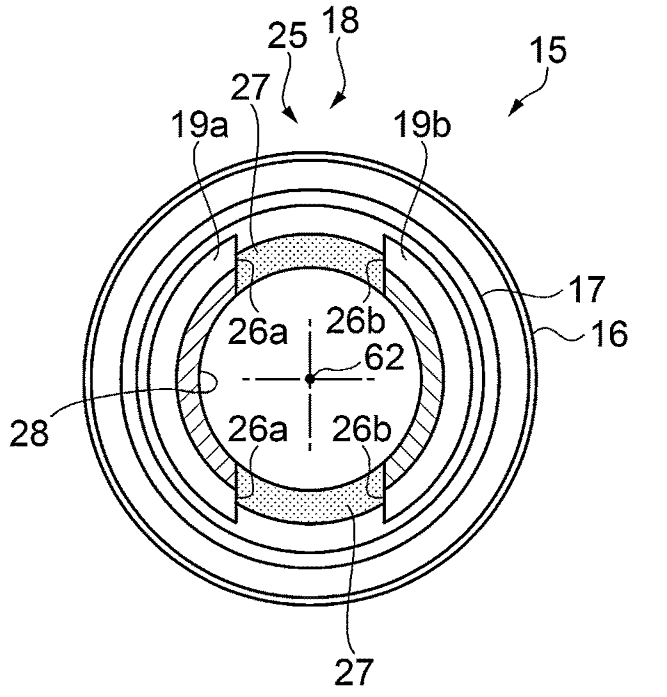
FIG. 9 is a plan view of the stud.

FIG. 6 is a perspective view of the stud, which corresponds to FIG. 5. FIG. 7 is a side view of the stud, which corresponds to FIG. 6. FIG. 8 is an enlarged diagram of part VIII in FIG. 7. FIG. 9 is a plan view of the stud, which corresponds to FIG. 7. In the following description, the balance bridge 13 side will also be referred to as a lower side and the slit portion 25 side of the spring receiving portion 18 will also be referred to as an upper side. Meanwhile, an upper surface of the balance bridge 13 will also be referred to as a reference surface 13*b*.

As illustrated in FIGS. 6 and 7, the stud 15 is a columnar member that is vertically erected from the balance bridge 13. The stud 15 includes the base portion 16 to be inserted and fixed to the balance bridge 13, the support portion 17, the spring receiving portion 18, and the like. In a preferred example, brass is used as a material of the stud 15. However, the material is not limited thereto and only needs to be a metal. For example, nickel silver may be used instead.

The support portion 17 is a columnar region which is slightly thinner than the base portion 16. Here, an upper part of the support portion 17 is formed into a truncated conical shape which is gradually narrowed in conformity with an outline of the spring receiving portion 18. Nonetheless, the support portion 17 has a columnar shape as a whole. The spring receiving portion 18 is a tapered region having a truncated conical shape which is gradually narrowed from the upper part of the support portion 17. The slit portion 25 is formed at an upper part of the spring receiving portion 18. Here, the shapes of the support portion 17 and the spring receiving portion 18 are not limited to the above-mentioned shapes. The shapes only need to be such shapes that enable formation of the slit portion 25. For example, the spring receiving portion 18 may be formed into a columnar shape instead.

As illustrated in FIG. 7, the slit portion 25 is a notch portion in a rectangular shape that is cut out by a pair of side surfaces 26*a* and 26*b* as well as a bottom surface 27. Meanwhile, the side walls 19*a* and 19*b* are regions divided by the slit portion 25. The side wall 19*a* includes the side surface 26*a*, and the side wall 19*b* includes the side surface 26*b*. Here, a line segment that passes through the center of the spring receiving portion 18 is defined as a center line 62. The center line 62 is the line segment that is perpendicular to the reference surface 13*b*. In other words, the spring receiving portion 18 is provided on the support portion 17 and includes the slit portion 25 to which the hairspring 8 is to be inserted and fixed. Moreover, the spring receiving portion 18 is formed into the truncated conical shape with its center in line with center line 62 that passes through the center of the column.

As illustrated in FIG. 7, the groove 35 is provided between the support portion 17 and the spring receiving portion 18, which is the annular groove formed by cutting the outer periphery. In other words, the groove 35 that forms a constricted portion on the outer periphery is provided between the support portion 17 and the spring receiving portion 18. Moreover, the groove 35 goes round along the outer periphery of the column.

As illustrated in FIG. 8, the groove 35 is formed from a first surface 35*a* being parallel to the center line 62 and constituting a bottom portion of the groove 35, a second surface 35*b* crossing the first surface 35*a* and being located on the spring receiving portion 18 side, and a third surface 35*c* crossing the first surface 35*a* and being located on the support portion 17 side. In a preferred example, the third surface 35*c* is parallel to an upper surface 36 of the support portion 17. The upper surface 36 of the support portion 17 is parallel to the reference surface 13*b*. Here, the parallelism in the present embodiment includes not only perfect parallelism but also substantial parallelism within a certain error range. Meanwhile, the present disclosure is not limited to the above-described configuration and the third surface 35*c* may be inclined to a lower side of the center line 62. For example, the third surface 35*c* may have an inclination at an angle θ with respect to the upper surface 36 of the support portion 17 as illustrated in FIG. 8. The angle θ represents an inclination to the lower side of the center line 62. According to this configuration, the adhesive 44 (FIG. 5) that fills the groove 35 thrusts more into the groove 35. Thus, it is possible to increase an effect of preventing the adhesive 44 from dropping off.

In other words, the groove 35 includes the first surface 35*a* being parallel to the center line 62 and constituting the bottom portion of the groove 35, the second surface 35*b* crossing the first surface 35*a* and being located on the spring receiving portion 18 side, and the third surface 35*c* crossing the first surface 35*a* and being located on the support portion 17 side. The third surface 35*c* is either parallel to the upper surface 36 of the support portion 17 or inclined to the lower side of the center line 62.

Here, the groove 35 has been described above as the groove in a trapezoidal shape with its cross-section including the first surface 35*a*, the second surface 35*b*, and the third surface 35*c*. However, without limitation to the foregoing, the groove 35 only needs to be a groove formed by cutting the peripheral portion, which may be a groove having a semicircular shape, a triangular shape, or a rectangular shape, for example.

As illustrated in FIG. 7, the bottom surface 27 of the slit portion 25 is located substantially at the center of the groove 35. Here, the location is not limited to the substantial center. The bottom surface 27 of the slit portion 25 only needs to reach the groove 35 and to be located above the third surface 35*c* of the groove 35. In other words, the slit portion 25 is a notch portion that is formed from the upper surface toward the bottom surface of the spring receiving portion 18 in the truncated conical shape, and thrusts into a portion of the groove 35. Moreover, the bottom surface 27 of the slit portion 25 is located above the third surface 35*c* of the groove 35. Meanwhile, the stud 15 is the stud 15 provided with the slit portion 25 to which the hairspring 8 is to be inserted and fixed. The stud 15 includes the groove 35 formed on the outer periphery at a position overlapping the bottom surface 27 of the slit portion 25.

As illustrated in FIG. 9, a hole 28 is provided at the center of the spring receiving portion 18. The hole 28 is a circular hole centered on the center line 62 with its depth provided halfway of the support portion 17.

In the side wall 19*a*, the pair of side surfaces 26*a* are disposed linearly across the hole 28. An inner peripheral edge of the side wall 19*a* is formed into an arc shape along the hole 28. Likewise, in the side wall 19*b*, the pair of side surfaces 26*b* are disposed linearly across the hole 28. An inner peripheral edge of the side wall 19*b* is formed into an arc shape along the hole 28. By providing the hole 28 at the lower portion of the slit portion 25 as described above, the adhesive 44 also thrusts into the hole 28 in the course of filling with the adhesive 44, so that its adhesive force can further be increased.

Manufacturing Method of Hairspring with Stud

Figure 10:
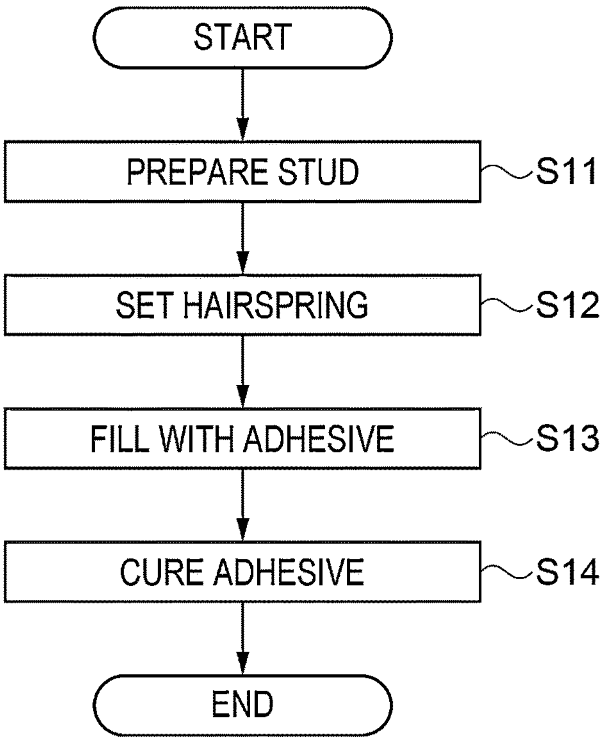
FIG. 10 is a flowchart illustrating a flow of a manufacturing method of a hairspring with stud.

FIG. 10 is a flowchart illustrating a flow of a manufacturing method of the hairspring with stud.

Here, the flow of the manufacturing method of the hairspring with stud 85 will be described mainly with reference to FIG. 10 together with other drawings as appropriate.

The stud 15 is prepared in step S11. In other words, the slit portion 25 to which the outer end portion 82 of the hairspring 8 is to be inserted and fixed, and the stud 15 including the groove 35 formed on the outer periphery are prepared.

In step S12, the outer end portion 82 of the hairspring 8 is inserted and set to the slit portion 25 of the stud 15 as illustrated in FIG. 5.

In step S13, the inside of the slit portion 25 and the groove 35 are filled with the adhesive 44 as illustrated in FIG. 5. In other words, the adhesive 44 is put into the slit portion 25 in the state of inserting the outer end portion 82 of the hairspring 8 into the slit portion 25. Then, the adhesive 44 is also put in so as to thrust into the groove 35. Here, the order of step S12 and step S13 may be switched. To be more precise, the outer end portion 82 of the hairspring 8 may be set to the slit portion 25 after filling the inside of the slit portion 25 and the groove 35 with the adhesive 44. According to this order, it is also possible to fill the inside of the slit portion 25 and the groove 35 with the adhesive 44 in the state of setting the outer end portion 82 of the hairspring 8 as with the aforementioned order because the adhesive 44 wraps around the outer end portion 82 of the hairspring 8. In other words, the process of filling the inside of the slit portion 25 with the adhesive 44 in the state of inserting the outer end portion 82 of the hairspring 8 into the slit portion 25 also includes the method of setting the outer end portion 82 of the hairspring 8 after filling with the adhesive 44.

In a preferred example, an ultraviolet curable resin is used as the adhesive 44. Moreover, a viscosity of the adhesive 44 before curing is preferably in a range from 400 mPa·s to 600 mPa·s inclusive. By setting the viscosity in this range, it is possible to achieve an appropriate viscosity while keeping the adhesive from being too soft. Thus, a required location can be filled with an appropriate amount of the adhesive with good workability.

In step S14, the adhesive 44 is cured by evenly irradiating the adhesive 44 put therein with ultraviolet rays. In other words, in the curing process, the adhesive 44 is cured in the state of being present in the groove 35. That is to say, the adhesive 44 is present in the slit portion 25 and in the groove 35.

In this way, the outer end portion 82 of the hairspring 8 in the state of being inserted into the slit portion 25 is attached and fixed to the spring receiving portion 18 by using the adhesive 44 as illustrated in FIG. 5. Here, the inside of the slit portion 25 inclusive of the hole 28 as well as the entire periphery of the groove 35 are filled with the adhesive 44 and these components are firmly integrated together. As a consequence, the adhesive 44 inside the groove 35 serves as the locking portion so that the adhesive 44 can be prevented from dropping off the slit portion 25. In other words, the adhesive 44 inside the groove 35 functions as a hook so as to exert an anchoring effect, whereby the adhesive 44 can be prevented from dropping off the slit portion 25.

Here, the adhesive 44 is not limited to the ultraviolet curable resin and only needs to be an adhesive that can retain firm bonding after being cured. Such an adhesive may be an epoxy-based adhesive, a hot-melt adhesive, a brazing metal as typified by solder, and the like.

As described above, the following advantageous effects are available according to the stud 15, the hairspring with stud 85, the balance with hairspring 400, the watch 100, and the manufacturing method of the hairspring with stud 85 of the present embodiment.

The stud 15 includes the support portion 17 formed into the columnar shape, and the spring receiving portion 18 being provided on the support portion 17 and including the slit portion 25 to which the hairspring 8 is to be inserted and fixed. The spring receiving portion 18 is formed into the truncated conical shape centered on the center line 62 that passes through the center of the column. The groove 35 that forms the constricted portion on the outer periphery is provided between the support portion 17 and the spring receiving portion 18. The slit portion 25 is the notch portion that is formed from the upper surface toward the bottom surface of the spring receiving portion 18 in the truncated conical shape, and thrusts into a portion of the groove 35.

According to this configuration, the groove 35 that functions as the locking portion for preventing the adhesive 44 from dropping off is formed along the outer periphery of the columnar stud 15. Thus, the groove 35 can be formed by a process in the circumferential direction of the stud 15. Therefore, unlike the stud of the related art that requires a different process such as drilling on the side wall of the slit portion, this configuration involves a fewer number of processes and manufacturing efficiency is therefore improved. In particular, since the stud 15 is a small component with a height of several millimeters, it is not easy to make an arrangement for changing machine tools. In this regard, the manufacturing efficiency is improved when the same machine tool can process the groove 35. Moreover, the adhesive 44 inside the annular groove 35 functions as the hook and exerts the anchoring effect, so that the adhesive 44 can be prevented from dropping off the slit portion 25.

As a consequence, it is possible to provide the stud 15 that is excellent in manufacturing efficiency and capable of preventing the adhesive 44 from dropping off.

Meanwhile, the groove 35 includes the first surface 35*a* being parallel to the center line 62 and constituting the bottom portion of the groove 35, the second surface 35*b* crossing the first surface 35*a* and being located on the spring receiving portion 18 side, and the third surface 35*c* crossing the first surface 35*a* and being located on the support portion 17 side. The third surface 35*c* is either parallel to the upper surface 36 of the support portion 17 or inclined to the lower side of the center line 62.

According to this configuration, the adhesive 44 that fills the groove 35 thrusts more into the groove 35. Thus, it is possible to increase the effect of preventing the adhesive 44 from dropping off.

In the meantime, the bottom surface 27 of the slit portion 25 is located above the third surface 35*c* of the groove 35.

According to this configuration, a portion of the adhesive 44 that fills the slit portion 25 and a portion of the adhesive 44 that fills the groove 35 join together inside the groove 35. Thus, the adhesive 44 can be integrated.

Moreover, the groove 35 goes round along the outer periphery of the column of the stud 15.

According to this configuration, the adhesive 44 that fills the groove 35 is also formed into the annular shape and is therefore structured firmly as the locking portion. Thus, the adhesive 44 can be prevented from dropping off.

In the meantime, there is provided the hairspring with stud 85 in which the outer end portion 82 of the hairspring 8 is attached to the stud 15 by using the adhesive 44. Here, the stud 15 is provided with the slit portion 25 to which the outer end portion 82 of the hairspring 8 is to be inserted and fixed, and the groove 35 formed on the outer periphery. The slit portion 25 thrusts into a portion of the groove 35, and the adhesive 44 is present in the slit portion 25 and in the groove 35.

According to this configuration, it is possible to provide the hairspring with stud 85 including the stud 15, which is excellent in manufacturing efficiency and capable of preventing the adhesive 44 from dropping off.

Meanwhile, the balance with hairspring 400 includes the hairspring with stud 85, the balance staff 410 rotatably supported by the receiving member, the balance wheel 420 fixed to the balance staff 410, and the collet 56 fixed to the balance staff 410.

According to this configuration, it is possible to provide the balance with hairspring 400 including the stud 15, which is excellent in manufacturing efficiency and capable of preventing the adhesive 44 from dropping off.

In the meantime, the watch 100 includes the balance with hairspring 400, and the movement 10 containing the balance with hairspring 400.

According to this configuration, it is possible to provide the watch 100 including the stud 15, which is excellent in manufacturing efficiency and capable of preventing the adhesive 44 from dropping off.

The manufacturing method of the hairspring with stud 85 includes preparing the slit portion 25 to which the outer end portion 82 of the hairspring 8 is to be inserted and fixed and the stud 15 provided with the groove 35 formed on the outer periphery, filling the inside of the slit portion 25 with the adhesive 44 in the state of inserting the outer end portion 82 of the hairspring 8 into the slit portion 25, and curing the adhesive 44. In the filling with the adhesive 44, the adhesive 44 is caused to thrust into and fill the groove 35. In the curing, the adhesive 44 is cured in the state of being present in the groove 35.

According to this configuration, the stud 15 which is excellent in manufacturing efficiency and capable of preventing the adhesive 44 from dropping off can be manufactured efficiently.

The stud 15 is the stud 15 including the slit portion 25 to which the hairspring 8 is to be inserted and fixed, which includes the groove 35 that forms the constricted portion on the outer periphery at the position overlapping the bottom surface 27 of the slit portion 25.

According to this configuration, the groove 35 that functions as the locking portion for preventing the adhesive 44 from dropping off is formed along the outer periphery of the columnar stud 15. Thus, the groove 35 can be formed by the process in the circumferential direction of the stud 15. Therefore, unlike the stud of the related art that requires a different process such as drilling on the side wall of the slit portion, this configuration involves a fewer number of processes and manufacturing efficiency is therefore improved. Moreover, the adhesive 44 inside the annular groove 35 functions as the hook and exerts the anchoring effect, so that the adhesive 44 can be prevented from dropping off the slit portion 25.

As a consequence, it is possible to provide the stud 15 that is excellent in manufacturing efficiency and capable of preventing the adhesive 44 from dropping off.

Embodiment 2

Different Modes of Stud

Figure 11:
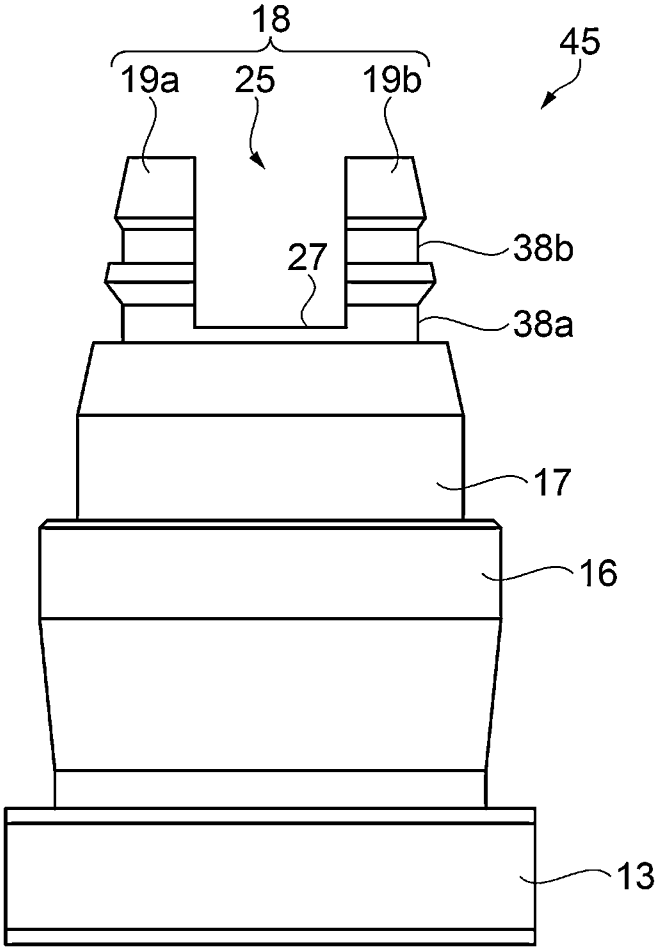
FIG. 11 is a side view of a stud according to Embodiment 2.
Figure 12:
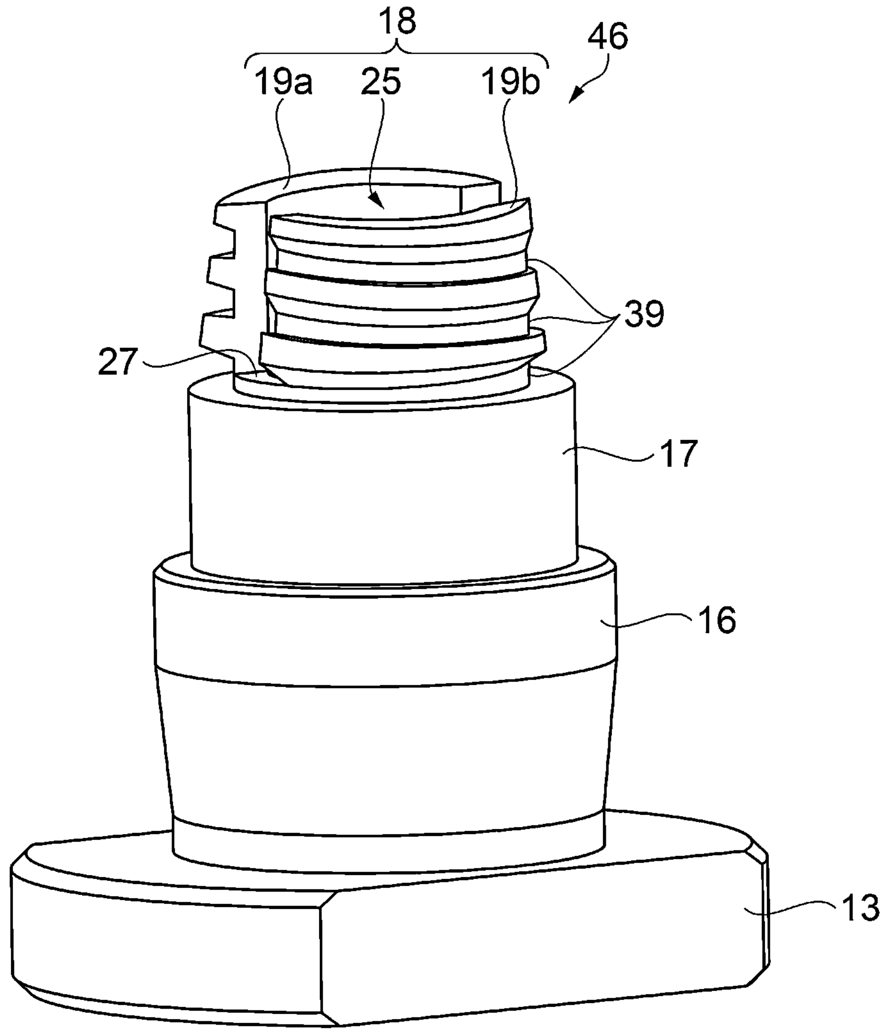
FIG. 12 is a perspective view of a stud of a different aspect.

FIG. 11 is a side view of a stud according to Embodiment 2, which corresponds to FIG. 7. FIG. 12 is a perspective view of a stud of a different aspect, which corresponds to FIG. 7.

In the above-described embodiment, the spring receiving portion 18 of the stud 15 is explained to be provided with the single groove 35. However, the present disclosure is not limited to this configuration. Two or more grooves may be provided or a helical groove may be provided. In the following description, the same regions as those in the above-described embodiment will be denoted by the same reference signs and overlapping explanations will be omitted.

As illustrated in FIG. 11, a stud 45 of the present embodiment includes two grooves 38*a* and 38*b* on the outer periphery of the spring receiving portion 18.

The groove 38*a* is a first groove which is the same groove as the groove 35 of the Embodiment 1.

The groove 38*b* is a second groove which is provided above the groove 38*a*. The groove 38*b* is divided into the side wall 19*a* side and the side wall 19*b* side by the slit portion 25. In other words, there are two grooves, namely, the groove 38*a* as the first groove including the bottom surface 27 of the slit portion 25, and the groove 38*b* as the second groove being located above the groove 38*a* and divided by the slit portion 25.

In the stud 45, the inside of the slit portion 25 and the grooves 38*a* and 38*b* are filled with the adhesive 44 in an adhesion process.

According to this configuration, there are two grooves of the grooves 38*a* and 38*b* that function as the locking portion for preventing the adhesive 44 from dropping off. Thus, it is possible to carry out the adhesion more firmly.

As illustrated in FIG. 12, a stud 46 of the present embodiment includes a helical groove 39 on the outer periphery of the spring receiving portion 18. In a preferred example, the groove 39 goes round the outer periphery of the spring receiving portion 18 three times. However, the groove 39 only needs to go round at least once. The bottom surface 27 of the slit portion 25 thrusts into the lowest groove portion of the groove 39. In other words, the groove 39 helically goes round at least once along the outer periphery of the columnar spring receiving portion 18.

In the stud 46, the inside of the slit portion 25 and the helical groove 39 are filled with the adhesive 44 in the adhesion process.

According to this configuration, the groove functioning as the locking portion for preventing the adhesive 44 from dropping off is formed into the groove 39 that goes round three times. Thus, it is possible to carry out the adhesion more firmly.

As described above, according to the studs 45 and 46 of the present embodiment, the following advantageous effects can be obtained in addition to the advantageous effects of the above-described embodiment.

The grooves of the stud 45 include two grooves, namely, the groove 38*a* as the first groove including the bottom surface 27 of the slit portion 25, and the groove 38*b* as the second groove being located above the groove 38*a* and divided by the slit portion 25.

According to this configuration, the two grooves 38*a* and 38*b* are formed along the outer periphery of the columnar stud 45 and can therefore be formed by the process in the circumferential direction of the stud 45. Hence, this configuration involves a fewer number of processes and manufacturing efficiency is therefore improved. Moreover, the adhesive 44 can be prevented from dropping off.

As a consequence, it is possible to provide the stud 45 that is excellent in manufacturing efficiency and capable of preventing the adhesive 44 from dropping off.

Meanwhile, the groove 39 of the stud 46 helically goes round at least once along the outer periphery of the columnar spring receiving portion 18.

According to this configuration, the helical groove 39 is formed along the outer periphery of the columnar stud 46 and can therefore be formed by the process in the circumferential direction of the stud 46. Hence, this configuration involves a fewer number of processes and manufacturing efficiency is therefore improved. Moreover, the adhesive 44 can be prevented from dropping off.

As a consequence, it is possible to provide the stud 46 that is excellent in manufacturing efficiency and capable of preventing the adhesive 44 from dropping off.

Embodiment 3

Different Mode of Adhesive

Figure 13:
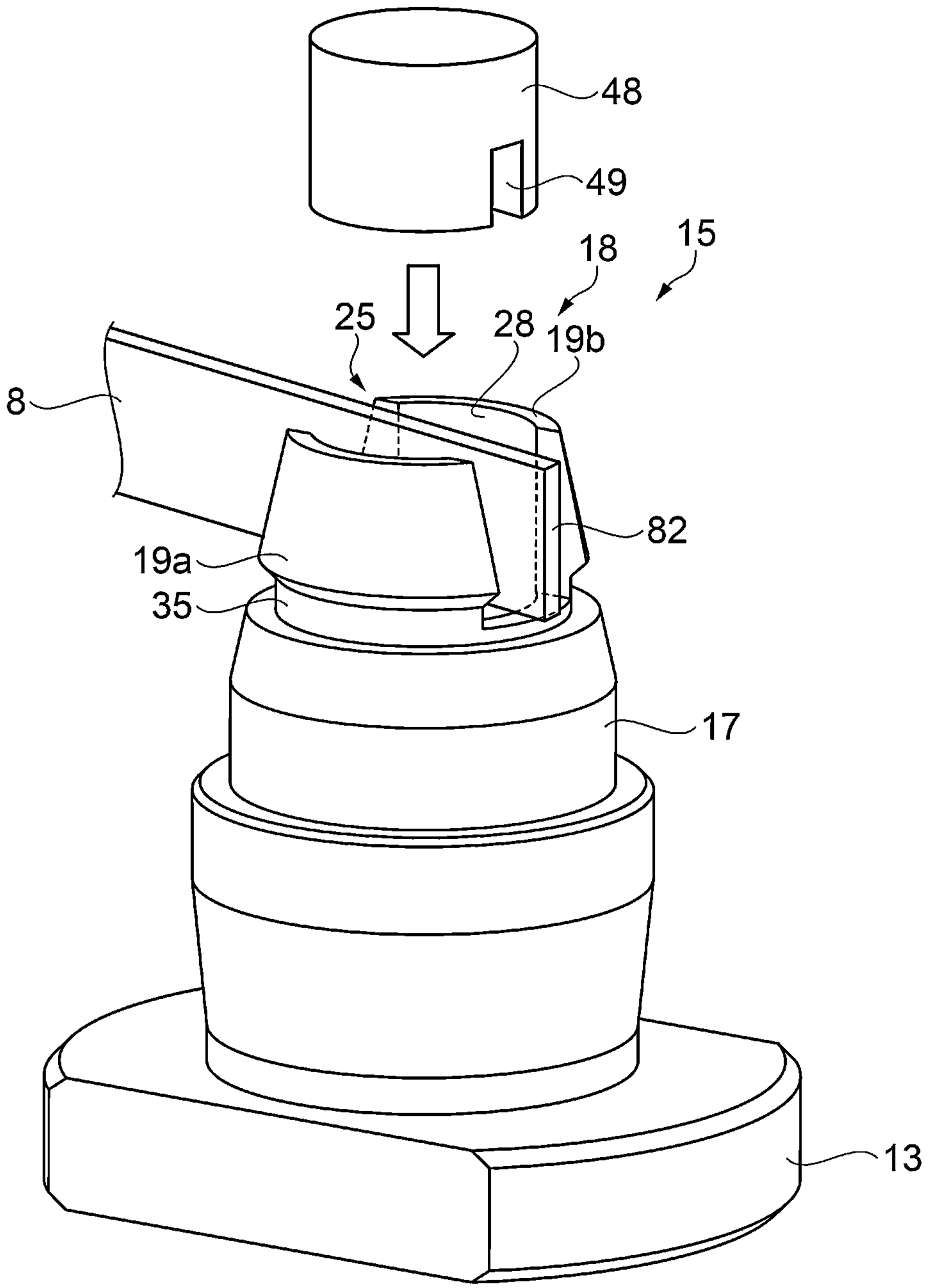
FIG. 13 is a perspective view of a hairspring with stud according to Embodiment 3.

FIG. 13 is a perspective view of a hairspring with stud according to Embodiment 3, which corresponds to FIG. 5.

In the above-described embodiments, the adhesive 44 before curing has been explained as a liquid. However, the present disclosure is not limited to this configuration and a solid adhesive member may be used instead. In the following description, the same regions as those in the above-described embodiments will be denoted by the same reference signs and overlapping explanations will be omitted.

As illustrated in FIG. 13, the present embodiment is different from the explanations of Embodiment 1 in that an adhesive member 48 that is solid in an initial state before curing is used as the adhesive.

The adhesive member 48 is formed into a cylindrical shape and has such a shape that can be housed inside the slit portion 25 of the stud 15. A diameter of the adhesive member 48 is slightly smaller than that of the hole 28 at the upper part of the stud 15, and a notch portion 49 in such a shape that corresponds to the outer end portion 82 of the hairspring 8 is provided on a lower surface. For example, the adhesive member 48 is a thermoplastic adhesive pellet that contains a material such as a natural resin as typified by covering of insects or the like, and a synthetic resin formed from phenol resin, polyamide resin, ethylene vinyl acetate, or the like.

In the process of filling with the adhesive, the adhesive member 48 is set to the slit portion 25. In the curing process, the adhesive member 48 is melted by heating. When the adhesive member 48 is melted, the melted adhesive fills the inside of the slit portion 25 and the entire periphery of the groove 35. Thereafter, the adhesive member 48 is cured by cooling for a predetermined period. In this way, it is possible to carry out the adhesion and fixation equivalent to the state of the adhesive 44 in FIG. 5. Here, the notch portion 49 of the adhesive member 48 may be omitted. Since the adhesive member 48 is formed from the soft resin pellet, the adhesive member 48 is deformed and fits into the slit portion 25 by pushing into the slit portion 25 even without providing the notch portion 49.

In other words, the adhesive is the solid adhesive member 48. The adhesive member 48 is set to the slit portion 25 in the process of filling with the adhesive. In the curing process, the adhesive member 48 is melted by heating and then cured by cooling.

As described above, according to the stud 15 and the adhesive member 48 of the present embodiment, the following advantageous effects can be obtained in addition to the advantageous effects of the above-described embodiments.

The adhesive is the solid adhesive member 48. The adhesive member 48 is set to the slit portion 25 in the process of filling with the adhesive. In the curing process, the adhesive member 48 is melted by heating and then cured by cooling.

According to this configuration, the adhesive member 48 only needs to be set to the slit portion 25. This is easier than filling with the liquid adhesive and the manufacturing efficiency is also good. Moreover, the adhesive can be prevented from dropping off.

As a consequence, it is possible to provide the manufacturing method of the hairspring with stud 85, which is excellent in manufacturing efficiency and capable of preventing the adhesive from dropping off.

What is claimed is:

1. A stud comprising:

a support portion formed into a shape of a column; and a spring receiving portion provided on the support portion and including a slit portion to which a hairspring is inserted and fixed, wherein the spring receiving portion is formed into a truncated conical shape centered on a center line that passes through a center of the column, a groove that forms a constricted portion on an outer periphery of the column is provided between the support portion and the spring receiving portion, the slit portion is a notch portion that is formed from an upper surface toward a bottom surface of the spring receiving portion in the truncated conical shape, and thrusts into a portion of the groove, the groove includes:

a first surface being parallel to the center line and constituting a bottom portion of the groove;

a second surface crossing the first surface and being located on a side of the spring receiving portion; and a third surface crossing the first surface and being located on a side of the support portion, the third surface is parallel to an upper surface of the support portion or inclined to a lower side of the center line, and a bottom surface of the slit portion is located above the third surface of the groove.

2. The stud according to claim 1, wherein the groove goes round along the outer periphery of the column.

3. The stud according to claim 1, wherein the stud includes a plurality of the grooves, and the plurality of the grooves include:

a first groove provided with the bottom surface of the slit portion, and; and a second groove located above the first groove and divided by the slit portion.

4. The stud according to claim 1, wherein the groove helically goes round at least once along the outer periphery of the column.

5. A hairspring formed by attaching an end portion of the hairspring to a stud by using an adhesive, wherein the stud is provided with a slit portion to which the end portion of the hairspring is inserted and fixed, and a groove formed on an outer periphery, the slit portion thrusts into a portion of the groove, the adhesive is present in the slit portion and in the groove, the slit portion is included in a spring receiving portion provided on a support portion, the support portion is formed into a shape of a column having the outer periphery, and a center line passes through a center of the column, the groove includes:

a first surface being parallel to the center line and constituting a bottom portion of the groove;
a second surface crossing the first surface and being located on a side of the spring receiving portion; and
a third surface crossing the first surface and being located on a side of the support portion, and
the bottom surface of the slit portion is located above the third surface of the groove.

6. A balance with hairspring comprising:
the hairspring with stud according to claim 5;
a balance staff rotatably supported by a receiving member;
a balance wheel fixed to the balance staff; and
a collet fixed to the balance staff.

7. A watch comprising:
the balance with hairspring according to claim 6; and
a movement containing the balance with hairspring.

8. A stud comprising:
a slit portion to which a hairspring is to be inserted and fixed, the slit portion being included in a spring receiving portion provided on a support portion, the support portion being formed into a shape of a column, and a center line passing through a center of the column, wherein
the stud includes a groove that forms a constricted portion on an outer periphery of the column at a position overlapping a bottom surface of the slit portion,
the groove includes:
a first surface being parallel to the center line and constituting a bottom portion of the groove;
a second surface crossing the first surface and being located on a side of the spring receiving portion; and
a third surface crossing the first surface and being located on a side of the support portion, and
the bottom surface of the slit portion is located above the third surface of the groove.

9. A stud comprising:
a support portion formed into a shape of a column; and
a spring receiving portion provided on the support portion and including a slit portion to which a hairspring is inserted and fixed, wherein
the spring receiving portion is formed into a truncated conical shape centered on a center line that passes through a center of the column in a plan view,
a groove extends one full turn along an outer circumference of the stud between the support portion and the spring receiving portion, and
the slit portion is formed from an upper surface toward a bottom surface of the spring receiving portion in the truncated conical shape, and the slit portion thrusts into a portion of the groove.

* * * * *